Oct. 11, 1949.                E. D. LABRUM                2,484,299
              SYSTEM FOR TIMING EXPOSURE INTERVAL
                     OF PHOTOGRAPHIC PRINTS
                       Filed Oct. 20, 1947

INVENTOR.
ERVIN D. LABRUM
BY
ATTORNEY

Patented Oct. 11, 1949

2,484,299

UNITED STATES PATENT OFFICE 2,484,299

SYSTEM FOR TIMING EXPOSURE INTERVAL OF PHOTOGRAPHIC PRINTS

Ervin D. Labrum, Seattle, Wash.

Application October 20, 1947, Serial No. 780,908

7 Claims. (Cl. 250—214)

This invention relates to the art of printing from photographic negatives, and has for its particular object to provide an electronic timer which will automatically control the time interval in which a print is exposed to light rays emanating from the exposure lamp.

With this general object in mind and which will appear and be understood in the following description and claims, the invention consists in the arrangement, adaptation, and combination of parts hereinafter described and claimed.

Figure 1:
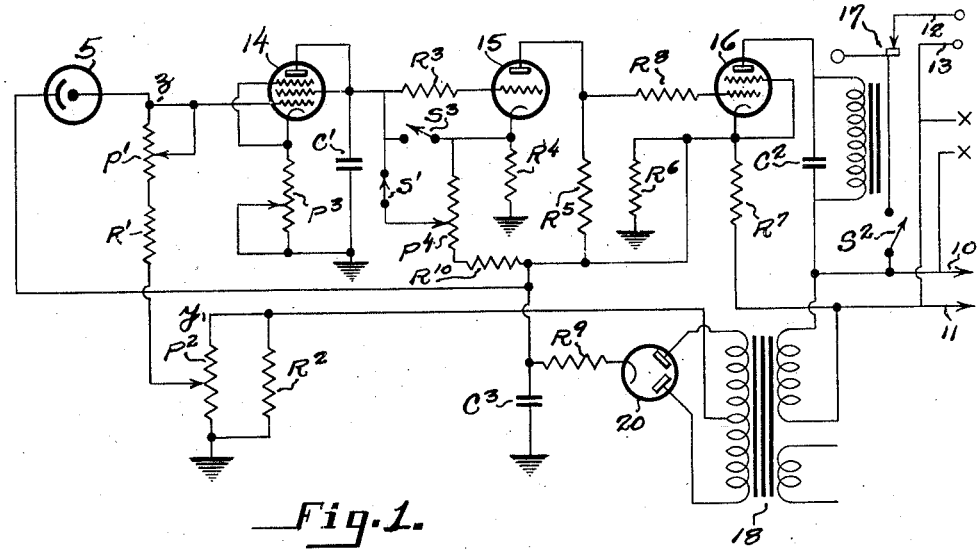

In the accompanying drawings:

Figure 1 is a wiring diagram illustrating the preferred embodiment of a severalty of electric elements associated in a manner operative to accomplish the end object of the present invention.

Figure 3:
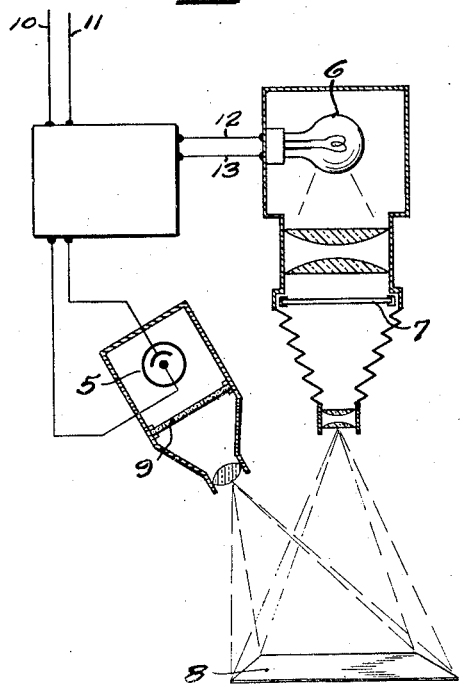
Figure 2:
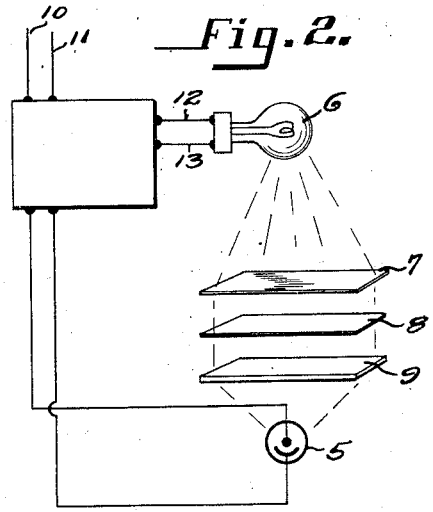

Fig. 2 is a schematic elevational view representing the relationship which the photo-cell of the present invention bears to the negative, the print, and the exposure lamp of a printing lay-out when the printing is being performed by what is commonly known as the contact procedure; and Fig. 3 is a view similar to Fig. 2 but showing the relationship of these parts when a projection procedure is resorted to in performing the printing operation.

Clarity in an understanding of the present invention will perhaps be advanced by first pointing out that the present device employs a photo-electric vacuum tube sensitive to rays of light, subjecting this tube only to the light being used to expose the print, and utilizing the photo-cell to operate a relay which in turn controls an electric circuit including the exposure lamp. In the instance of contact printing, and as will be seen from an inspection of Fig. 2, the photo-cell, denoted by the numeral 5, is placed such that it is affected by the light rays emanating from an exposure lamp 6 only after the intensity of these rays is modified by their passage first through the negative 7, then the printing papers, and finally through a diffusing screen 9. While these several parts 7, 8 and 9 are, for better perception, indicated as being separated one from the other, normal contact printing, as the name implies, would find the negative, the paper, and the screen in touching or closely proximate relation. When exposure is accomplished by the projection procedure illustrated in Fig. 3, and in which the light from the lamp 6 is projected through the negative 7 onto the printing paper 8, I then desirably place the photo-cell 5 above and to one side of the printing paper and rely upon reflection from the sensitized surface of the paper to activate the cell, the placement of the screen 9 being functionally the same as with contact printing, and namely in a position between the paper and the photo-cell for intercepting and diffusing the rays of light.

Now to consider the circuit, and which derives its electric current through main leads 10 and 11 while applying its current to the lamp through leads 12 and 13, there is employed, with the lamp and with the photo-cell 5, a severalty of vacuum tubes. While two will suffice, it is desirable that three be employed and these I denote 14, 15 and 16. Tubes suitable for the purpose are, respectively, 6SJ7, 6C5, and 2050. Tied in with the lamp, the cell and these tubes is a relay 17, a transformer 18, a rectifier tube 20 for the transformer, and certain switches, condensers, resistors, and potentiometers, all of which will appear from an inspection of the drawing and whose functions, where not self-evident, will be hereinafter pointed out, largely in course of tracing the operation. Using the letters S, C, R and P, with differentiating exponents, to respectively denote these switches, condensers, resistors and potentiometers, the operation may be described as follows:

Let it be assumed that the system is in the condition in which it is illustrated in Fig. 1, and namely with switch S—1 closed and switches S—2 and S—3 open. These switches are manually operated and the arrangement is desirably one in which the two switches S—1 and S—2 are ganged together to operate in unison, the opening of the one simultaneously closing the other. To now prepare the system for operation, a circuit is caused to be completed through the power lines 10—11 by closing a master switch (not shown). The resulting positive voltage on potentiometer $P^4$ affects the condenser $C^1$ to charge the latter. By such charging, a positive voltage is placed on the plate and screen of the tube 14 but by reason of the grid of the tube being biased to the cut-off no current passes the tube. The potentiometer $P^2$ and the resistor $R^2$ are on the negative side of the power supply and the directive flow of the current is such that point $y$ is negative with respect to the ground. The potentiometer $P^2$ has as its function a control of the circuit such that the grid of the tube 14 is minus to the cut-off point, being at cut-off when the photo-cell 5 is unaffected by any light. The fact that the plate element of the tube 14 is positive and has the grid of tube 15 direct-coupled thereto perforce makes the grid of the latter tube positive and this responsively causes current to flow through the load resistor $R^5$. There thus develops a voltage drop across the resistor, and the provision of a direct connection from the positive side of the resistor to the cathode of the tube 16 makes the control grid of this tube negative with respect to the cathode. Having a sharp cut-off characteristic of 2 volts negative in the instance of a 2050 gas triode, no plate current flows through the relay 17 and the contact points of the latter are hence closed, but it will be understood that the circuit through lead lines 12—13 to the exposure lamp 6 is broken in that the switch $S^2$ is open.

Now, to energize the lamp for initiating an exposure operation, the operator actuates the ganged switches $S^1$ and $S^2$ to open the former and close the latter, whereupon the circuit to the lamp is completed. As the light rays responsively reach the photo-cell 5 the condenser $C^1$ commences to discharge, this being permitted due to the fact of the current flow being more positive at point $z$ of the potentiometer $P^1$ to offset the bias cut-off conditions of the tube 14. The greater the intensity of the light striking the photo-cell, the faster the rate of discharge from the condenser $C^1$ and as this discharge proceeds to such an extent as causes the control grid of tube 15 to reach the negative bias cut-off point, plate current flow through resistor $R^5$ ceases and, with no voltage drop, the control grid of tube 16 becomes zero with respect to the cathode and the tube 16 passes its maximum current, responsively breaking the contact of the relay 17 to de-energize the exposure lamp 6. This will have completed a printing cycle and the procedure is repeated for successive printing operations, first activating the ganged switches to again simultaneously close switch $S^1$ and open switch $S^2$ to effectuate a charging of the condenser $C^1$, and then closing switch $S^2$ while simultaneously opening switch $S^1$.

Having an understanding of the operating nature of the parts, it will be self-evident that minor departures may be resorted to without sacrifice of the inventive concept, in which respect it is particularly pointed out that the tube 15 might be deleted. When so deleted, and with direct connection between tubes 14 and 16, the latter would be constantly drawing plate current while the exposure lamp is on and the resulting system would be somewhat less sensitive.

The purpose of the various electrical parts which I have elected to illustrate and not hereinbefore expressly mentioned will be largely apparent but may be briefly set forth. $P^1$ and $R^1$ act in complement as a single variable resistor, and their office within the system is that of an adjusting means for either increasing or decreasing the amount of load resistance transmitted to the tube 14, causing greater or less voltage drop with any given current flow. This variable resistor is effective when light rays of minor intensity play upon the photo-cell, namely when using a dark or thick negative, and there is ordinarily no need for any change in the setting once the same has been set by initial tests made upon the system. This is likewise true of the setting given the potentiometer $P^3$ which lies in the cathode circuit of the tube 14 and is experimentally set to properly dampen out brighter light to which the photo-cell is subjected or, more objectively stated, modifying the time interval of exposure for proper handling of light or thin negatives. $P^2$ is in the bias circuit of the tube to control the cut-off point.

The remaining potentiometer, and namely $P^4$, is the only one of the variable resistance elements which calls for any manual adjustment after the system has been test-set, and this unit is manually controlled in compensation of differences in the emulsion speeds of printing which exist between various grades of paper.

$P^4$, $R^4$, and $R^{10}$ are hooked in series to produce a voltage divider assuring a voltage drop across $R^{10}$ and $P^4$ of the magnitude required to obtain the proper voltage upon the cathode of the tube 15.

The resistor $R^9$ and the condenser $C^3$ are essentially a part of the power circuit and perform a filtering office to obtain a required voltage drop on the photo-cell, and in this respect it may be stated that an efficient working of the system is or may be obtained by impressing 80 volts on the power supply and 20 volts on the cathode of the tube 15, this latter voltage being necessarily lower than the voltage upon the cathode of the tube 16. With the figures given the voltage drop across the resistor $R^2$ should be in the neighborhood of 15 volts.

The two resistors $R^3$ and $R^8$ are each a high-ohm unit and are employed to protect the circuit, acting to affect the ratio of discharge in case a tube, in consequence of being defective, draws grid current. The faulty tube then evidences itself and can be replaced before damage results to the system. The two leads marked X—X serve merely as a pilot-light connection evidencing a live circuit through the main leads 10 and 11.

The salient teaching of the present invention is the concept of using a photo-cell, a relay, a tube for controlling the relay, and a condenser serving as a reservoir, with the operational procedure, for timing the exposure interval, being one in which recourse is had to the time necessary to accomplish a draining of the reservoir charge. The system is shown as incorporating a means, and namely the switch $S^3$, the closing of which makes the system non-automatic and allows manual control of the exposure time should the latter, for any reason, be desired.

The present system gives to the operator a means of automatically and accurately controlling, to a fractional part of a second, the exposure of a print, the conventional procedure having been previously one in which the operator resorts to an inspection of the exposed negative to estimate the proper time interval and then either closes and opens a circuit to the exposure lamp manually or by the employment of a timer which he first sets to the estimated time. For commercial printing, the present invention not only appreciably speeds up production with improved printing, but also reduces waste to a minimum and enables inexperienced operators to be employed with assurance of satisfactory returns from the automatic system, it being necessary simply that the operator activate a control member common to the two switches $S^1$ and $S^2$, moving the same in one direction to charge the condenser and in an opposite direction to open the circuit to the lamp which responsively excites the photo-cell and initiates a dissipation of the condenser's charge.

The invention, the manner of its operation, and its accomplishments are believed to be clearly understood from the foregoing. While having illustrated and described the embodiment of the invention now preferred by me, minor departures therefrom may obviously be resorted to without departing from the spirit of the invention, and it is my intention that the hereto annexed claims be read with a scope commensurate with the broadest interpretation which the employed language permits.

What I claim is:

1. The described electronic system for automatically timing the exposure interval when printing from an exposed negative and which comprises, in combination: an exposure lamp, a photo-electric tube energized by rays of light emanating from the lamp and passing through the negative, and a severalty of electric circuits one of which includes the lamp, another of which includes the tube, and still another of which includes a condenser acting to normally carry a storage charge of current, a vacuum tube and a series resistor provided in the condenser circuit controlled by an energizing of the tube connected in shunt with the condenser and acting to cause the condenser to be bled of its stored charge and to responsively open the lamp circuit when dissipation is complete, said electrical means acting to effectuate a discharge of current from the condenser at a predetermined rate corresponding to the intensity of the light rays striking said tube.

2. The system of claim 1 having a manually operated switch for closing the last-named circuit, and a second manually operated switch introduced in the lamp circuit and arranged to work in complement with the electrical devices such that the circuit through the lamp is closed only by its combination action therewith, the two switches being adapted to work oppositely in unison the one being open while the other is closed.

3. The described electronic system for automatically timing the exposure interval when printing from an exposed negative and which comprises, in combination: an exposure lamp, a photo-electric cell energized by rays of light emanating from the lamp and passing through the negative, a relay, an electric circuit including the lamp and two circuit-closing switches in series one of which is manually operated and the other normally closed and opened by activation of the relay, a second electric circuit including the relay and a condenser arranged to carry a storage charge of current and also including, connected in shunt with the condenser, electric devices which operate to hold the relay inactive when the condenser is in a charged condition while activating the relay upon a dissipation of the charge and which are controlled by the photocell such as to responsively cause the condenser to lose its charge by an energizing of the cell and then at a predetermined rate corresponding to the intensity of the light rays striking the cell.

4. The described electronic system for automatically timing the exposure interval when printing from an exposed negative and which comprises, in combination: an exposure lamp, a photo-electric tube energized by rays of light emanating from the lamp and passing through the negative, a relay, and a severalty of electric circuits one of which includes the lamp and two circuit-closing switches in series, one of these switches being normally closed and opened by activation of the relay and the other being manually operated, another of which circuits includes a manually operated circuit-closing switch and a condenser acting to receive and store a charge of current when the circuit is closed, and still another of which circuits is inter-related with the second-named circuit, is controlled by the tube, and includes the condenser and the relay together with electrical devices connected in shunt with the condenser and operating to hold the relay inactive when the condenser is in a charged condition and to activate the relay upon a dissipation of the charge, the electrical devices last-named being operative by a coincident opening of the last-named and a closing of the first-named of the two manually operated switches to effectuate a discharge of current from the condenser at a predetermined rate corresponding to the intensity of the light rays striking the tube.

5. The described electronic system for automatically timing the exposure interval when printing from an exposed negative and which comprises, in combination: an exposure lamp, a photo-electric tube energized by rays of light emanating from the lamp and passing through the negative, a relay, and a severalty of electric circuits one of which includes the lamp and two circuit-closing switches in series, one of these switches being normally closed and opened by activation of the relay and the other being manually operated, another of which circuits includes a manually operated circuit-closing switch and a condenser acting to receive and store a charge of current when the circuit is closed, and still another of which circuits is inter-related with the second-named circuit, is controlled by the tube, and includes the condenser and the relay together with electrical devices connected in shunt with the condenser and operating to hold the relay inactive when the condenser is in a charged condition and to activate the relay upon a dissipation of the charge, the electrical devices last-named being operative by a coincident opening of the last-named and a closing of the first-named of the two manually-operated switches to effectuate a discharge of current from the condenser at a predetermined rate corresponding to the intensity of the light rays striking the tube, the two manually-operated switches being ganged together in a manner to work oppositely in unison with the one being open while the other is closed.

6. In an electronic system for automatically timing the exposure interval when printing from an exposed negative: the combination of an exposure lamp, a photo-electric tube energized by rays of light passing through the negative, the quantum of light reaching the light-sensitive element of the tube directly effecting the amount of current flowing through said element, an electric control-circuit containing said tube and including a resistor, a condenser in said circuit normally carrying a storage charge of current, a vacuum tube and a series resistor controlled by an energizing of the photo-electric tube and connected in shunt with the condenser in such a manner that when bias voltage of the vacuum tube is effected by energizing rays on the light-sensitive element the condenser will be bled of its charge and the lamp circuit responsively opened as the lowering charge potential of the condenser reaches a predetermined level.

7. The described electronic machine for automatically timing the exposure interval when printing from an exposed negative in the process of contact printing, the photo record and the sensitized material being in close proximity to each other, and which comprises, in combination, an exposure lamp, a photo-electric tube, and means for holding said negative and sensitized material in close proximity and in a printing position, the components of the machine being so arranged as to have light rays from the printing lamp pass through both the photo record being printed and the sensitized material being exposed before reaching the photo tube.

ERVIN D. LABRUM.

REFERENCES CITED

The following references are of record in the file of this patent:

UNITED STATES PATENTS

| Number | Name | Date |
|---|---|---|
| 1,939,243 | Twyman | Dec. 12, 1933 |
| 1,954,338 | Tuttle et al. | Apr. 10, 1934 |
| 1,973,468 | Denis | Sept. 11, 1934 |
| 2,000,589 | Fuller | May 7, 1935 |
| 2,232,373 | Dorst | Feb. 18, 1941 |
| 2,274,158 | Penther | Feb. 24, 1942 |
| 2,353,218 | Burnham et al. | July 11, 1944 |